United States Patent
Peng et al.

(10) Patent No.: US 12,531,580 B2
(45) Date of Patent: Jan. 20, 2026

(54) MEASUREMENT RECEIVER ARCHITECTURE FOR DIGITAL PRE-DISTORTION (DPD) IN MILLIMETER WAVE PHASED ARRAY ENVIRONMENT

(71) Applicant: MediaTek Inc., Hsin-Chu (TW)

(72) Inventors: Solti Peng, San Jose, CA (US); Jenwei Ko, San Jose, CA (US); Caiyi Wang, San Jose, CA (US)

(73) Assignee: MEDIATEK INC., Hsin-Chu (TW)

( * ) Notice: Subject to any disclaimer, the term of this patent is extended or adjusted under 35 U.S.C. 154(b) by 335 days.

(21) Appl. No.: 18/334,328

(22) Filed: Jun. 13, 2023

(65) Prior Publication Data

US 2024/0137053 A1 Apr. 25, 2024
US 2024/0235587 A9 Jul. 11, 2024

Related U.S. Application Data

(60) Provisional application No. 63/380,594, filed on Oct. 24, 2022.

(51) Int. Cl.
*H04B 1/04* (2006.01)
*H04B 7/06* (2006.01)

(52) U.S. Cl.
CPC ......... *H04B 1/0475* (2013.01); *H04B 7/0617* (2013.01); *H04B 2001/0425* (2013.01)

(58) Field of Classification Search
CPC .... H04B 1/0475; H04B 1/0483; H04B 1/005; H04B 1/04; H04B 2001/0425; H04B 1/40; H04B 7/0617; H04B 1/62
See application file for complete search history.

(56) References Cited

U.S. PATENT DOCUMENTS

| | | | |
|---|---|---|---|
| 7,502,631 B2 | 3/2009 | Hashemi et al. | |
| 9,762,268 B2 | 9/2017 | Yang | |
| 11,152,699 B2 | 10/2021 | Tervo et al. | |
| 2010/0087227 A1* | 4/2010 | Francos | H04B 7/06 455/562.1 |

(Continued)

FOREIGN PATENT DOCUMENTS

EP 3285402 A1 12/2021
JP 2016167145 A1 4/2017

OTHER PUBLICATIONS

Fager et al., Linearity and efficiency in 5G transmitters: New techniques for analyzing efficiency, linearity, and linearization in a 5G active antenna transmitter context. IEEE Microwave Magazine. Apr. 3, 2019;20(5):35-49.

(Continued)

*Primary Examiner* — Tuan Pham
(74) *Attorney, Agent, or Firm* — McClure, Qualey & Rodack, LLP

(57) ABSTRACT

Described herein are phased array and transceiver systems with distortion measurement circuitry configured to obtain distortion measurements of system transmitters and provide the distortion measurements to receive beamforming components of the system. Such systems advantageously make use of existing beamforming components of the system to additionally route distortion measurements for baseband DPD processing. Such systems may not need external components to measure signals radiated by antennas of the system or dedicated paths linking system transmitters directly to a baseband processor. In some embodiments, receive beamforming components may be configured to sum distortion measurements from each transmitter to create an aggregate distortion measurement usable as representative of the average transmitter for DPD processing.

19 Claims, 7 Drawing Sheets

(56) References Cited

U.S. PATENT DOCUMENTS

| | | | |
|---|---|---|---|
| 2010/0127932 A1* | 5/2010 | Heikkinen | H04B 17/21 |
| | | | 342/374 |
| 2012/0050094 A1 | 3/2012 | Nakabayashi et al. | |
| 2017/0176507 A1* | 6/2017 | O'Keeffe | H04B 17/19 |
| 2017/0324161 A1 | 11/2017 | Kareisto et al. | |
| 2017/0356985 A1 | 12/2017 | Yoshino | |
| 2019/0131934 A1 | 5/2019 | Khalil | |
| 2020/0348395 A1 | 11/2020 | Belot et al. | |

OTHER PUBLICATIONS

Hesami et al., Single digital predistortion technique for phased array linearization. 2019 IEEE International Symposium on Circuits and Systems (ISCAS). May 26, 2019: 5 pages.

NG et al., Digital predistortion of millimeter-wave RF beamforming arrays using low number of steering angle-dependent coefficient sets. IEEE Transactions on Microwave Theory and Techniques. Jul. 16, 2019;67(11):4479-92.

Tervo et al., Digital predistortion of amplitude varying phased array utilising over-the-air combining. 2017 IEEE MTT-S International Microwave Symposium (IMS) Jun. 4, 2017:1165-8.

Tervo et al., Digital predistortion of millimeter-wave phased array transmitter with over-the-air calibrated simplified conductive feedback architecture. 2020 IEEE/MTT-S International Microwave Symposium (IMS). Aug. 4, 2020:543-6.

Yu et al., Full-angle digital predistortion of 5G millimeter-wave massive MIMO transmitters. IEEE Transactions on Microwave Theory and Techniques. Jun. 19, 2019;67(7):2847-60.

Communication dated Nov. 6, 2025, issued in application No. EP 23 204 822.3.

\* cited by examiner

MEASUREMENT RECEIVER ARCHITECTURE FOR DIGITAL PRE-DISTORTION (DPD) IN MILLIMETER WAVE PHASED ARRAY ENVIRONMENT

CROSS-REFERENCE TO RELATED APPLICATIONS

This application claims the benefit under 35 U.S.C. § 119(e) of U.S. Provisional Application No. 63/380,594, filed Oct. 24, 2022, and entitled, "MEASUREMENT RECEIVER ARCHITECTURE FOR (DPD) IN MILLIMETER WAVE PHASED ARRAY ENVIRONMENT," which is hereby incorporated by reference herein in its entirety.

BACKGROUND

Phased array systems are antenna transmission and/or reception systems that typically include many antennas arranged in an array and connected to a transceiver system. A transceiver system transmits and/or receives signals via an array of antennas.

A transceiver system in a phased array system may include transmit and/or receive beamforming circuitry that applies appropriate phase shifts and/or time delays to transmitted signals prior to the signals reaching the antennas for transmission and/or signals received using the antennas. Phase shifts and/or time delays are used to steer the transmitted signals in a particular direction of focus, thereby forming a transmit beam in that direction, and/or to steer the direction of reception by the array in a particular direction of focus, thereby forming a receive beam in that direction.

Digital Pre-Distortion (DPD) processing is used in antenna systems to compensate for non-linearity in the gain and/or phase of the system's transmitter(s). It is desirable for transmitters to apply substantially the same amount of amplification to each signal that is to be transmitted over a range of initial signal power levels, resulting in linear amplifier gain over that range. In DPD, a measurement of a transmitter's output may be obtained and provided to a processor to create a non-linearity profile for the transmitter. Using the non-linearity profile, signals to be transmitted by the transmitter may be appropriately pre-distorted (e.g., their power levels adjusted to be higher or lower and/or phases adjusted) to compensate for non-linearity in the transmitter.

BRIEF SUMMARY

Some embodiments relate to a transceiver system comprising a plurality of transceivers, each comprising a transmit path comprising a transmit amplifier and a receive path comprising a receive amplifier, beamforming circuitry having a plurality of inputs coupled to respective ones of the receive paths, and a plurality of distortion measurement paths coupling respective outputs of the transmit amplifiers to the beamforming circuitry.

In some embodiments, each of the plurality of distortion measurement paths may comprise a coupler configured to obtain a portion of a signal output from the transmit amplifier and an impedance-controlled transmission line coupling the coupler to the beamforming circuitry.

In some embodiments, the plurality of transceivers may be configured to operate in at least one frequency band within a range from 10 GHz to 300 GHz.

In some embodiments, the plurality of transceivers may be configured to operate in at least one frequency band within a range from 24 GHz to 71 GHz.

In some embodiments, the transceiver system may further comprise a plurality of antennas coupled to the plurality of transceivers and configured to transmit and/or receive signals in at least one frequency band within a range from 10 GHz to 300 GHz.

In some embodiments, the transceiver system may further comprise a baseband processor configured to receive distortion measurements of the transmit amplifiers via the beamforming circuitry and perform digital pre-distortion (DPD) processing based on the distortion measurements.

In some embodiments, the beamforming circuitry is configured to sum the distortion measurements of the transmit amplifiers and the baseband processor may be configured to use the summed distortion measurements as representative of an average distortion measurement for performing the DPD processing.

In some embodiments, the transceiver system may further comprise demodulation circuitry coupled between the plurality of distortion measurement paths and at least a portion of the beamforming circuitry and configured to downconvert the distortion measurements of the transmit amplifiers.

In some embodiments, the plurality of distortion measurement paths may bypass the receive amplifiers to couple the respective outputs of the transmit amplifiers to the beamforming circuitry.

Some embodiments relate to a phased array system comprising an antenna, a transmitter configured to provide signals in at least one frequency band for transmission by the antenna, the at least one frequency band being within a range from 10-300 GHz, a receive beamformer, and circuitry bypassing the antenna and configured to obtain a distortion measurement from the transmitter and provide the distortion measurement to the receive beamformer.

In some embodiments, the transmitter may be configured to operate in at least one frequency band within a range from 24 GHz to 71 GHz.

In some embodiments, the circuitry may comprise a coupler configured to obtain the distortion measurement from the transmitter and an impedance-controlled transmission line coupled between the coupler and the receive beamformer.

In some embodiments, the coupler may be selected from the group consisting of a capacitive coupler, an inductive coupler, and a directional coupler.

In some embodiments, the coupler may be a directional coupler.

In some embodiments, the phased array system may further comprise a plurality of antennas that comprises the antenna, a plurality of transmitters that comprises the transmitter, and a plurality of impedance-controlled transmission lines that comprises the impedance-controlled transmission line, and the plurality of impedance-controlled transmission lines may bypass respective ones of the plurality of antennas and may be configured to obtain respective distortion measurements from respective ones of the plurality of transmitters and provide the distortion measurements to the receive beamformer.

In some embodiments, the phased array system may further comprise a baseband processor configured to perform digital pre-distortion (DPD) processing on signals to be transmitted via the plurality of transmitters, and the receive beamformer may be configured to sum the distortion measurements from the plurality of transmitters and provide the sum to the baseband processor for performing the DPD processing.

In some embodiments, the baseband processor may be configured to use the summed distortion measurements as representative of an average distortion measurement for performing the DPD processing.

In some embodiments, the phased array system may further comprise a demodulator coupled between the impedance-controlled transmission line and at least a portion of the receive beamformer and configured to down-convert the distortion measurement.

In some embodiments, the phased array system may further comprise a receive amplifier configured to obtain signals in at least one mmW frequency band from the antenna, and the impedance-controlled transmission line may bypass the receive amplifier to provide the distortion measurement to the receive beamformer.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the systems and devices described herein.

DETAILED DESCRIPTION

Figure 1:
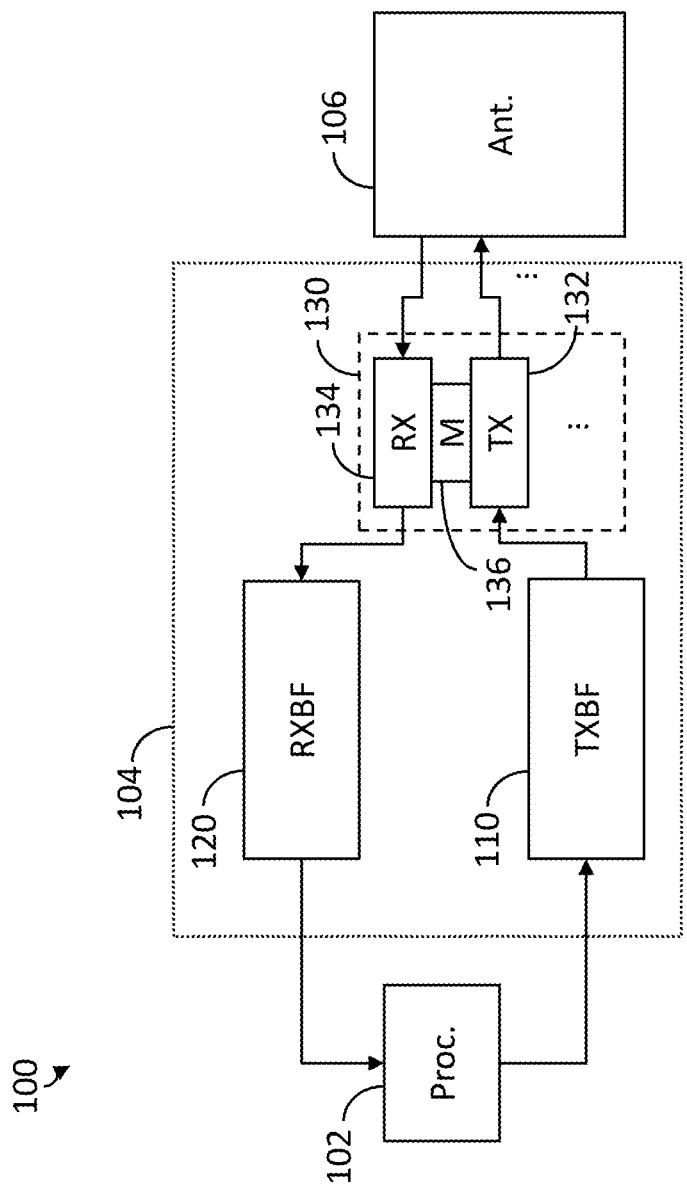
FIG. 1 is a block diagram of an example phased array system configured for distortion measurement, according to some embodiments.

The inventors have recognized several drawbacks of existing phased array systems that implement DPD. For instance, some existing phased array systems have external measurement components that receive signals radiated by the system antennas and provide the received signals to a baseband processor for DPD processing. However, external elements consume space in a communications device where space may not be available (e.g., in a mobile phone) and further add to the hardware cost of the system, making it impractical to implement an external element and dedicated distortion measurement path in some communications devices.

Other existing systems have dedicated distortion measurement paths from each transmitter directly to the baseband processor for DPD processing. However, dedicated distortion measurement paths from the transmitters to the baseband processor consume space and add hardware to the cost of the system. The extent of space consumption and hardware cost may be very high when the number of transmitters in the system is large, such as for beamforming applications. Moreover, when distortion measurements are desired in phased array systems operating at or near millimeter-wave (mmW) frequencies (e.g., in a range from 10 GHz-300 GHz), parasitic effects (e.g., due to parasitic capacitances and inductances) make it challenging to obtain distortion measurements representative of each transmitter using existing systems.

To overcome these drawbacks, the inventors developed systems with distortion measurement circuitry configured to obtain distortion measurements of the system transmitters and provide the distortion measurements to receive beamforming components of the system, thereby making use of existing beamforming components of the system to additionally route distortion measurements for baseband DPD processing. Such systems may not need external components to measure signals radiated by antennas of the system or dedicated paths linking system transmitters directly to a baseband processor. Moreover, in some embodiments, receive beamforming components may be configured to sum distortion measurements from each transmitter to create an aggregate distortion measurement, usable as representative of the average transmitter, for DPD processing.

In some embodiments, a transceiver system may include a plurality of transceivers, each with a transmit path having a transmit amplifier and a receive path having a receive amplifier. The transceiver system may further include beamforming circuitry having inputs coupled to respective ones of the receive paths. Distortion measurement paths may couple respective outputs of the transmit amplifiers to the receive paths. For example, the distortion measurement paths may include a coupler configured to obtain a portion of a signal output by the transmit amplifier and an impedance-controlled transmission line coupling the coupler to the inputs of the beamforming circuitry. In some embodiments, beamforming circuitry having inputs coupled to respective receive paths and distortion measurement paths coupling outputs of the transmit amplifiers to the receive paths advantageously reuses the beamforming circuitry to provide distortion measurements of the transmit amplifiers to a baseband processor for DPD processing.

In some embodiments, a phased array system may include an antenna, a transmitter configured to provide signals in at least one frequency band (e.g., within a range from 10-300 GHz) for transmission by the antenna, a receive beamformer, and circuitry bypassing the antenna and configured to obtain a distortion measurement from the transmitter and provide the distortion measurement to the receive beamformer. For example, the circuitry may include an impedance-controlled transmission line configured to obtain the distortion measurement from the transmitter via a coupler, such that the distortion measurement does not reach the antenna to be radiated externally. In some embodiments, bypassing the antenna to provide the distortion measurement to the receive beamformer makes it unnecessary to use an external element to receive signals radiated from the antenna to measure distortion for DPD processing.

In some embodiments, aspects described herein may be flexible enough for implementation in a variety of transceiver systems. For example, distortion measurements may be coupled from transmitters to beamformers that are implemented in a transmit and/or receive frequency band (e.g., within a range from 10 GHz to 300 GHz) and/or an intermediate frequency (IF) band making integration of such aspects into an existing transceiver system straightforward with little additional hardware or cost, in some embodiments.

It should be appreciated that aspects described herein may be used alone or in combination.

FIG. 1 is a block diagram of an example phased array system 100 configured for distortion measurement, according to some embodiments. As shown in FIG. 1, phased array system 100 includes a baseband processor 102, a transceiver system 104, and an antenna system 106. In some embodiments, baseband processor 102 may be configured to provide signals to transceiver system 104 for transmission via antenna system 106 and to receive signals from antenna system 106 via transceiver system 104.

In some embodiments, phased array system 100 may be implemented in a communication device, such as a mobile device (e.g., mobile phone), a centralized base station (e.g., central cell tower), or a distributed network node (e.g., decentralized evolved Node B). For example, the communication device may be configured for transmission and/or reception of cellular signals according to a cellular standard such as a 5G communications standard, though other existing and future cellular standards may benefit from the technology disclosed herein.

In some embodiments, components of phased array system 100 may be implemented in a communications device using integrated circuit technology. For example, baseband processor 102 may include one or more integrated circuits mounted on a circuit board and in communication with a central processing unit (CPU) of the communications device, though in some embodiments baseband processor 102 may be (and/or may be part of) the CPU of the communications device. In some embodiments, transceiver system 104 may include one or more integrated circuits coupled to the integrated circuit(s) of baseband processor 102. As one example, integrated circuits including baseband processor 102 and transceiver system 104 may be formed on the same circuit board and interconnected using traces of the circuit board, though in other embodiments they may be formed on different circuit boards connected to one another by an electrical connector. In some embodiments, antenna system 106 may be coupled to transceiver system 104 by one or more cables (e.g., coaxial cables).

In some embodiments, baseband processor 102 may be configured to control transmission and reception of signals using transceiver system 104 and antenna system 106. For example, baseband processor 102 may be located within a first communications device (e.g., a mobile phone) and configured to generate baseband signals encoded with a message (e.g., a binary coded message), such as encoded with data to be transmitted by antenna system 106 to another communications device (e.g., a cellular base station and/or evolved Node B).

In some embodiments, baseband processor 102 may be configured to modulate messages prior to transmission to encode the messages into signals for transmission, such as using a phase shift keyed (PS) encoding scheme. For example, baseband processor 102 may be configured to use a Binary Phase Shift Keyed (BPSK) and/or Quadrature Phase Shift Keyed (QPSK) modulation scheme. In another example, baseband processor 102 may be configured to use amplitude modulation (AM), such as Quadrature Amplitude Modulation (QAM).

In some embodiments, transceiver system 104 may be configured to steer and amplify signals from baseband processor 102 for transmission by antenna system 106 and to amplify and steer signals from antenna system 106 for providing to baseband processor 102. As shown in FIG. 1, transceiver system 104 includes transmit beamformer 110, receive beamformer 120, and transceivers 130.

In some embodiments, transmit beamformer 110 may be configured to steer signals from baseband processor 102 in a particular direction using antenna system 106. For example, transmit beamformer 110 may include phase shift and/or time delay circuitry configured to introduce a phase shift and/or time delay into signals from baseband processor 102 appropriate to steer the signals in a particular direction when fed to respective antennas of an antenna array within antenna system 106. In this example, by applying time delays and/or phase shifts to signals transmitted by respective antennas in a row and/or column of the antenna array, the signals may be steered in a particular direction with respect to the row and/or column. In some embodiments, transmit beamformer 110 may include one or more splitters configured to divide a signal from baseband processor 102 into multiple signals (e.g., for antennas within a particular row and/or column of an antenna array) such that transmit beamformer 110 may apply an appropriate phase and/or time delay to each divided signal. In other embodiments, baseband processor 102 may be configured to provide an appropriate number of signals to transmit beamformer 110 (e.g., for antennas within a particular row and/or column of an antenna array) for transmit beamformer to apply the appropriate phase and/or time delay to each signal.

In some embodiments, receive beamformer 120 may be configured to steer reception of signals using antenna system 106. For example, receive beamformer 120 may include phase shift and/or time delay circuitry configured to introduce a phase shift and/or time delay into signals from antenna system 106 appropriate to steer the signals from a particular direction prior to providing the signals to baseband processor 102. In some embodiments, receive beamformer 120 may include one or more summing circuits configured to combine the phase shifted and/or time delayed signals (e.g., from antennas within a particular row and/or column of an antenna array) into fewer signals, such as a single signal. For example, baseband processor 102 may be configured to process a single signal representative of the combined signals as though the single signal were received via a single antenna oriented to receive signals in the particular direction of receive beam focus.

In some embodiments, transceivers 130 may be configured to amplify signals from transmit beamformer 110 for transmission by antenna system 106, amplify signals received via antenna system 106 for providing to receive beamformer 120, and obtain distortion measurements for DPD processing. For example, as shown in FIG. 1, a transceiver 130 includes a transmitter 132 and a receiver 134. In some embodiments, transceiver system 104 may include a transceiver 130 for each antenna and/or group of antennas of antenna system 106. For example, each transmitter 132 may include a power amplifier configured to receive and amplify a respective signal from transmit beamformer 110 and provide the signal to a respective antenna and/or group of antennas of antenna system 106, and each receiver 134 may include a low noise amplifier configured to receive and amplify a signal from the respective antenna and/or group of antennas of antenna system 106. In some embodiments, transceivers 130 may further include a frequency mixer configured to up-convert signals from transmit beamformer 110 to a transmit frequency band (e.g., in a range from 10 GHz to 300 GHz) for transmission by antenna system 106 and/or a frequency mixer configured to down-convert signals from antenna system 106 to an IF band and/or baseband for beamforming by receive beamformer 120.

In some embodiments, transceivers 130 may be configured to obtain distortion measurements from transmitters 132 for DPD processing. For example, as shown in FIG. 1, the transceiver 130 further includes distortion measurement circuitry 136 coupled between transmitter 132 and receiver 134. In some embodiments, distortion measurement circuitry 136 may be configured to couple an output of transmitter 132 to receiver 134. For example, distortion measurement circuitry 136 may include a coupler configured to obtain a distortion measurement from transmitter 132, such as a capacitive, inductive, and/or directional coupler. In some embodiments, distortion measurement circuitry 136 may include an impedance-controlled transmission line connecting the coupler to receiver 134 for providing the distortion measurement to receive beamformer 120. The inventors recognized that coupling outputs of transmitters 132 of transceivers 130 to receive beamformer 120 facilitates obtaining distortion measurements from several or all transmitters 132 with little additional hardware required or space consumed, as receive beamformer 120 may be configured to pass the distortion measurements to the baseband processor along the same path(s) used to provide received signals to the baseband processor.

In some embodiments, receive beamformer 120 may be configured to combine distortion measurements from transceivers 130 into an aggregate distortion measurement, and baseband processor 102 may be configured to use the aggregate distortion measurement as representative of an average distortion measurement to be applied to signals transmitted using any transceiver 130. In some embodiments, baseband processor 102 may be configured to perform DPD processing using the distortion measurements during a calibration stage, such as upon system startup and/or periodically during operation of phased array system 100.

In some embodiments, antenna system 106 may be configured to transmit signals from transceivers 130 and/or to receive and provide signals to transceivers 130. For example, antenna system 106 may include an array of antennas, such as with an antenna and/or group of antennas for each transceiver 130. In some embodiments, each transceiver 130 may be coupled to an antenna in an array having a first dimension (e.g., rows) and a second dimension (e.g., columns). In some embodiments, antennas may be grouped within one of the first and second dimensions (e.g., by row or column). For example, a transceiver 130 may be configured to provide signals to a row or column of antennas. Alternatively or additionally, transceivers 130 may be configured to provide signals to respective antennas within the same row or column of antennas.

In some embodiments, baseband processor 102 may be configured to control transmit beamformer 110 to steer transmitted signals a direction that tracks a direction of target device determined using signals received from the target device. For example, baseband processor 102 may be configured to control the amount of time delay and/or phase shift applied by transmit beamformer 110 to result in steering signals in the determined direction of the target device. In this example, baseband processor 102 may be configured to determine the direction of the target device based on power levels of signals received from the target device via antenna system 106, transceivers 130, and receive beamformer 120, when receive beamformer 120 is controlled to steer reception of antenna system 106 in one or more directions.

In some embodiments, components of phased array system 100, such as transceiver system 104 and/or antenna system 106, may be configured to transmit and/or receive signals within at least one frequency band within in a range from 10 GHz and 300 GHz. In some embodiments, components of phased array system 100 may be configured to transmit and/or receive signals in at least one frequency band within a range between 24 GHz and 71 GHz. For example, components of phased array system 100 may be configured to operate in one or more frequency bands associated with a 5G communications standard, such as from 24-29 GHz, 37-40 GHz, 40-43 GHz, and/or 47-48 GHz, though other frequency bands may be used.

While not shown in FIG. 1, in some embodiments transmit beamformer 110 may include a digital-to-analog converter (DAC) configured to obtain digital signals from baseband processor 102 and generate analog signals for beamforming. In some embodiments, receive beamformer 120 may include an analog-to-digital converter (ADC) configured to digitize received signals and/or distortion measurements for providing to baseband processor 102. According to various embodiments, DACs and/or ADCs may be operated at baseband and/or in an IF band, for example. In some embodiments, transceiver system 104 may include components within and/or coupled between receive beamformer 120 configured to reduce the power level of received signals and/or obtained measurements to be within the dynamic range of the ADC(s). For example, the amount of power reduction may depend on the number of transceivers from which signals are received and/or measurements are obtained.

Figure 2:
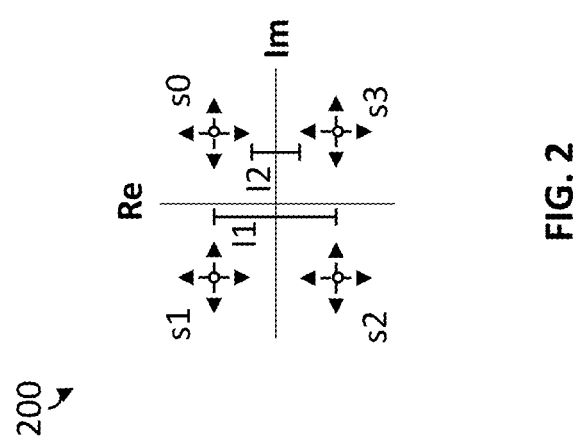
FIG. 2 is a graph of a Quadrature Phase Shift Keyed (QPSK) symbol constellation illustrating example effects of transmitter distortion, according to some embodiments.

FIG. 2 is a graph of a Quadrature Phase Shift Keyed (QPSK) symbol constellation 200 illustrating example effects of transmitter distortion, according to some embodiments. As shown in FIG. 2, constellation 200 includes four message symbols, s0, s1, s2, and s3.

In some embodiments, message symbols s0-s3 may represent distinct series of data bits selected to convey data from one communications device to another. For instance, message symbol s0 may correspond to the binary number 00, message symbol s1 may correspond to the binary number 01, message symbol s2 may correspond to the binary number 10, and message symbol s3 may correspond to the binary number 11.

In some embodiments, message symbols s0-s3 may be prone to distortion during transmission, such as when a signal containing one of the message symbols s0-s3 is amplified by a transmitter where non-linearity affects the message symbols s0-s3 differently. For example, non-linearity may cause each message symbol s0-s3 to drift within the constellation as indicated by the dotted arrows around each message symbol s0-s3. For instance, amplitude distortion may cause drift in the distance between the message symbol and the origin (e.g., sum of squares of real and imaginary components), and/or phase distortion may cause drift in the rotational position of the message symbol about the origin (e.g., inverse tangent angle of the ratio between real and imaginary components). In this example, isolation between adjacent message symbols, such as isolation level I1 shown between message symbols s1 and s2, could be reduced as far as to isolation level I2, shown between message symbols s0 and s3. Consequently, it is more likely that message symbols will be mistaken for one another in the presence of distortion, leading to a bit or symbol error, than without distortion.

In some embodiments, DPD processing may be employed to mitigate the impact of transmitter non-linearity on signal distortion. For example, where a transmitter is measured to distort a message symbol (e.g., by changing its power level and/or phase), DPD processing may be applied to compensate for the measured distortion, resulting in message symbols having substantially the desired amount of signal power and/or phase after amplification for transmission. Alternatively or additionally, in some embodiments, DPD processing may be employed to improve amplifier efficiency, such as by providing signals to the amplifier inputs with lower power levels that are close to a saturated power level as non-linearity caused by operating at or proximate the saturated power level may be mitigated by DPD processing.

In some embodiments, DPD processing may be implemented by driving one or more amplifiers with an input power sweep and/or a modulated signal (e.g., a quadrature amplitude modulated signal), obtaining one or more measurements of the amplifier output(s), and comparing the input signal to the measurement(s). For example, a transfer function may be determined to capture the relationship between the measurement(s) and the amplifier output(s), and the inverse of the transfer function may be applied to signals to be transmitted to compensate for measured distortion.

While a QPSK constellation is illustrated in FIG. 2 to show example effects of distortion due to non-linear transmitters, it should be appreciated that other message encoding schemes may be impacted similarly, and that distortion may occur in ways other than the illustrative example provided.

Figure 3:
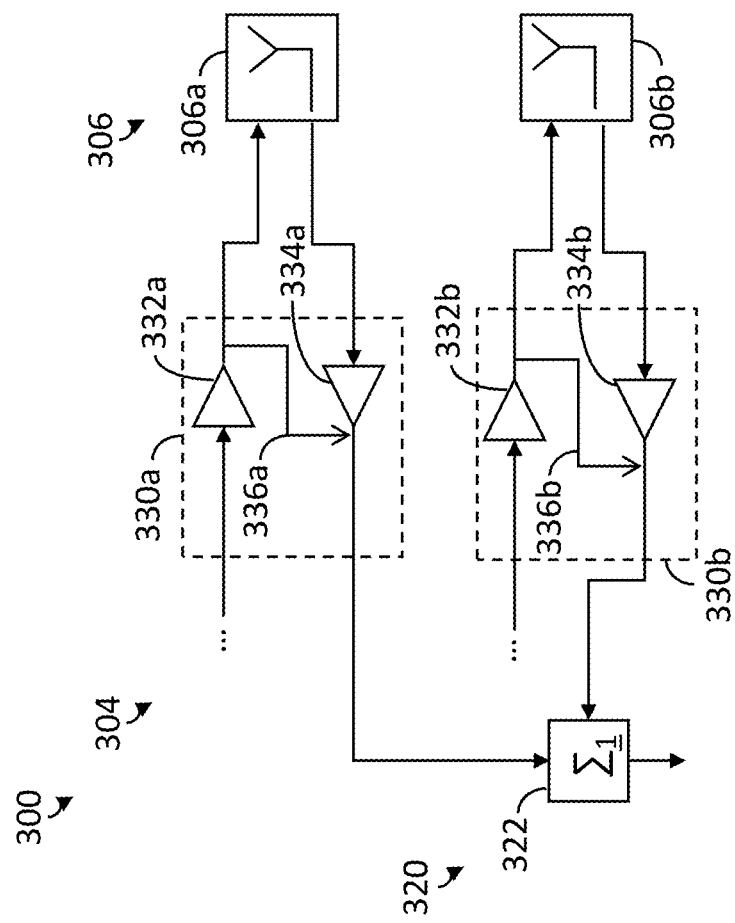
FIG. 3 is a circuit diagram of an example phased array system with distortion measurement paths bypassing antennas of the system, according to some embodiments.

FIG. 3 is a circuit diagram of a portion of an example phased array system 300, according to some embodiments. In some embodiments, phased array system 300 may be configured in the manner described herein for phased array system 100. For example, as shown in FIG. 3, phased array system 300 includes transceiver system 304 and antenna system 306. While not shown in FIG. 3, it should be appreciated that phased array system 300 may further include a baseband processor configured in the manner described herein for baseband processor 102 of system 100.

In some embodiments, transceiver system 304 may be configured in the manner described herein for transceiver system 104. For example, as shown in FIG. 3, transceiver system 304 includes receive beamformer 320 and transceivers 330a and 330b. While not shown in FIG. 3, it should be appreciated that transceiver system 304 may further include a transmit beamformer configured in the manner described herein for transmit beamformer 110 of transceiver system 104.

In some embodiments, transceivers 330a and 330b may be configured to provide signals to antennas 306a and 306b, respectively, for transmission and to receive signals from antennas 306a and 306b, respectively, and to provide the received signals to receive beamformer 320. For example, as shown in FIG. 3, transceiver 330a includes a transmitter disposed along a transmit path, in which an amplifier 332a is coupled to antenna 306a. Similarly, as shown in FIG. 3, transceiver 330b includes a transmitter disposed along a transmit path, in which an amplifier 332b is coupled to antenna 306b. In some embodiments, amplifiers 332a and 332b may be power amplifiers. Also shown in FIG. 3, transceiver 330a includes a receiver with a receive path, in which an amplifier is coupled between antenna 306a and receive beamformer 320. Similarly, as shown in FIG. 3, transceiver 330b includes a receiver in a receive path, in which an amplifier 334b is coupled between antenna 306b and receive beamformer 320. In some embodiments, amplifiers 334a and 334b may be low noise amplifiers.

In some embodiments, transceivers 330a and 330b may be further configured to obtain and provide distortion measurements to receive beamformer 320. For example, as shown in FIG. 3, distortion measurement circuitry of transceiver 330a includes a measurement path 336a coupled between outputs of amplifier 332a and amplifier 334a, and distortion measurement circuitry of transceiver 330b includes a measurement path 336b coupled between outputs of amplifier 332b and amplifier 334b. In some embodiments, circuitry may be disposed along each of measurement paths 336a and 336b to obtain distortion measurements from amplifiers 332a and 332b, respectively, and provide the distortion measurements to receive beamformer 320. For example, a coupler (e.g., a directional, capacitive, and/or inductive coupler) may be disposed in each measurement path 336a and 336b to obtain a portion of a signal output by the respective amplifier 332a or 332b. In some embodiments, an impedance-controlled transmission line may be disposed in each measurement path 336a and 336b to couple the portions of the signals to receive beamformer 320. In other embodiments, no impedance-controlled transmission line may be used. For example, the distance from the coupler to the receive beamformer 320 may be short enough that resulting parasitic effects are tolerable for some applications. As another example, a measurement from a coupler may be converted to a current and the path traveled by the current may have low enough impedance that resulting parasitic effects are tolerable for some applications.

In some embodiments, distortion measurement paths 336a and 336b may be configured to bypass antennas 306a and 306b. For example, as shown in FIG. 3, distortion measurement path 336a connects an output of amplifier 332a to an output of amplifier 334a without passing through antenna 306a. Likewise, as shown in FIG. 3, distortion measurement path 336b connects an output of amplifier 332b to an output of amplifier 334b without passing through antenna 306b. The inventors recognized that distortion measurement paths bypassing antennas of the phased array system facilitates distortion measurements that are internal to the system and thus take up less space and require fewer components than previous systems, which used external elements (e.g., an antenna) to receive signals radiated from the antennas and obtain distortion measurements therefrom for providing to a baseband processor.

In some embodiments, receive beamformer 320 may be configured in the manner described herein for receive beamformer 120 of transceiver circuitry 104. For example, as shown in FIG. 3, beamforming circuitry of receive beamformer 320 includes summing circuit 322. In some embodiments, summing circuit 322 may be configured to sum signals received from transceivers 330a and 330b and provide the summed signals to a baseband processor. For example, as shown in FIG. 3, summing circuit 322 has inputs coupled to outputs of amplifiers 334a and 334b, respectively, to receive signals amplified by amplifiers 334a and 334b after receiving the signals from antennas 306a and 306b. In this example, summed signals from summing circuit 322 may be representative of signals received in a particular direction for processing by the baseband processor. For instance, although not shown in FIG. 3, receive beamformer 320 may further include circuitry configured to apply appropriate phase shifts and/or time delays to signals received from amplifiers 334a and 334b prior to (e.g., upstream of) summation by summing circuit 322. In some embodiments, summing circuit 322 may be include one or a sequence of summing amplifiers, such as with resistors coupling respective transceivers 330a and 330b to an input of the amplifier(s) and the output of the amplifier(s) providing the resulting sum.

In some embodiments, summing circuit 322 may be further configured to sum distortion measurements from amplifiers 332a and 332b. For example, as shown in FIG. 3, inputs of summing circuit 322 are shown further coupled to outputs of distortion measurement paths 336a and 336b to receive distortion measurements propagated along the paths 336a and 336b. In this example, summed signals from summing circuit 322 may be representative of distortion measured from amplifiers 332a and 332b that may be used for DPD processing by the baseband processor. For instance, the baseband processor may be configured to use the summed distortion measurements as representative of the average amplifier non-linearity of transceiver system 304. The inventors recognized that using at least some of the same receive beamforming circuitry, such as summing circuit 322, for both received signal beamforming and distortion measurement summation facilitates distortion measurements for DPD processing without requiring additional, dedicated measurement paths from the amplifiers 332a and 332b to the baseband processor as would have been required by some previous systems.

In some embodiments, antenna system 306 may be configured in the manner described herein for antenna system 106. For example, as shown in FIG. 3, antenna system 306 includes first antenna 306a and second antenna 306b. While only two antennas are shown in FIG. 3, it should be appreciated that antenna system 306 may include any number of antennas, such as arranged in an array with multiple dimensions (e.g., rows and columns).

In some embodiments, distortion measurement circuitry described herein may be suitable for a wide range of transceiver system architectures. For example, distortion measurement circuitry described herein may be implemented with transmit and/or receive beamformers configured to operate, at least in part, in an intermediate frequency (IF) band. As another example, distortion measurement circuitry described herein may be implemented with transmit and/or receive beamformers configured to operate, at least in part, in transmit and/or receive frequency bands (e.g., in a range from 10 GHz to 300 GHz) at which signals are output by the transmitters and/or received by the receivers.

Figure 4A:
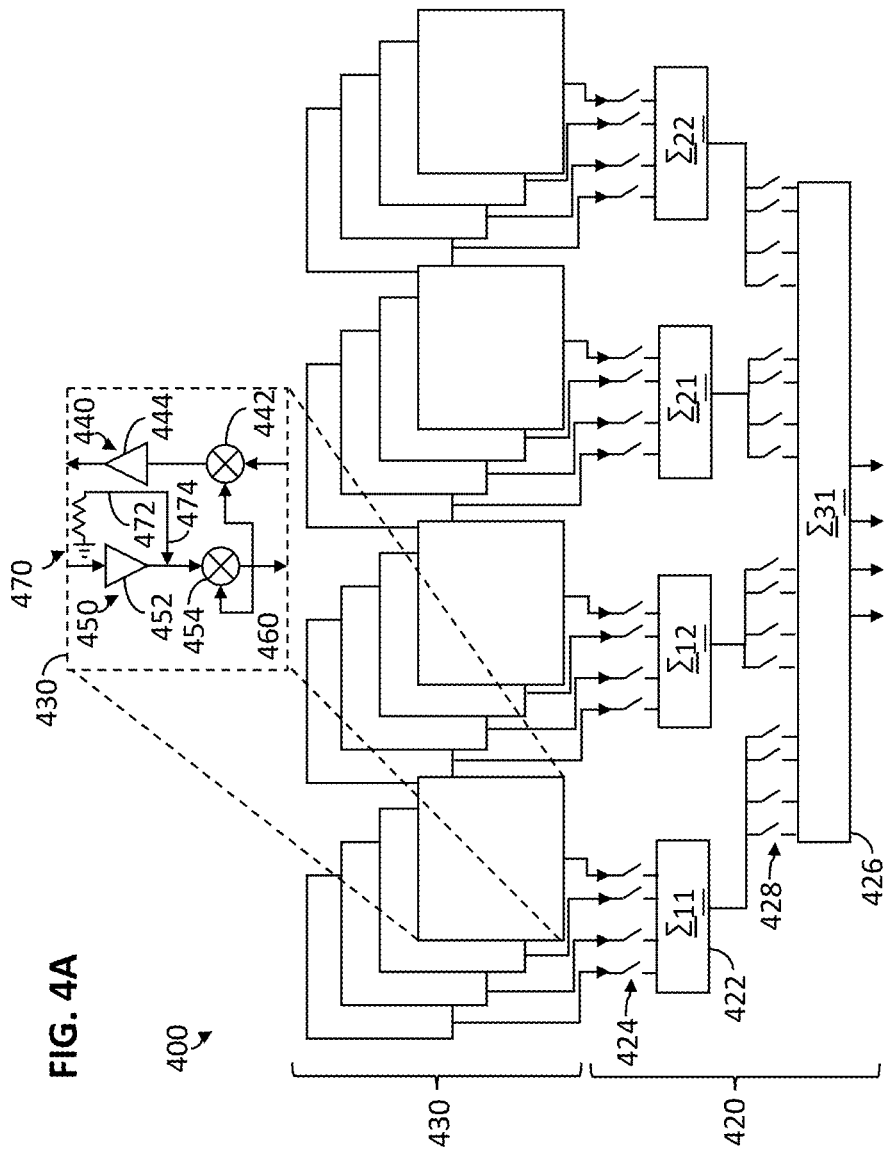
FIG. 4A is a circuit diagram of an example transceiver system configured for distortion measurement with intermediate frequency (IF) beamforming circuitry, according to some embodiments.

FIG. 4A is a circuit diagram of an example transceiver system 400 configured for distortion measurement with IF beamforming circuitry, according to some embodiments.

In some embodiments, transceiver system 400 may be configured in the manner described herein for transceiver system 304. For example, as shown in FIG. 4A, transceiver system 400 includes a receive beamformer 420 and transceivers 430. In some embodiments, transceivers 430 may be coupled to respective antennas or groups of antennas of an antenna system, such as described herein for transceiver system 104. In some embodiments, receive beamformer 420 may be coupled to a baseband processor, such as described herein for transceiver system 104.

In some embodiments, transceivers 430 may be configured in the manner described herein for transceivers 330a and 330b of transceiver system 304. For example, as shown in FIG. 4, a transceiver 430 includes a transmitter 440 with a modulator 442 and amplifier 444 in a transmit path configured to couple a transmit beamformer (not shown) to an antenna (not shown). In some embodiments, modulator 442 may include a frequency mixer configured to receive a local oscillator (LO) signal 460 for up-converting signals from an IF band, used by the transmit beamformer, to a transmit frequency band (e.g., in a mmW frequency band) for transmission by an antenna. For instance, where the transmit frequency band is centered at 27 GHz, the IF frequency band may be centered at 10 GHz, although other IF bands may be used depending on the signal bandwidth of the particular application. In some embodiments, amplifier 444 may be configured in the manner described herein for amplifiers 332a and 332b of transceiver system 304.

In some embodiments, transceivers 430 may include demodulation circuitry coupled between the distortion measurement paths of the transceivers and at least a portion of receive beamformer 420 and configured to down-convert the distortion measurements from the distortion measurement paths. For example, as shown in FIG. 4A, the transceiver 430 includes a receiver 450 with an amplifier 452 and a demodulator 454 in a receive path configured to couple an antenna to summing circuits of receive beamformer 420. In some embodiments, amplifier 452 may be configured in the manner described herein for amplifiers 334a and 334b of transceiver system 304. In some embodiments, demodulator 454 may include a frequency mixer configured to receive LO signal 460 for down-converting signals received from an antenna for summing by receive beamformer 420. For example, LO signals 460 received by each transceiver 430 may incorporate an appropriate time delay and/or phase shift such that summing the signals steers the signals in a particular direction.

In some embodiments, transceivers 430 may be configured to obtain and provide distortion measurements to receive beamformer 420 as described herein for transceivers 330a and 330b of transceiver system 304. For example, as shown in FIG. 4A, transceiver 430 includes distortion measurement circuitry 470 including a path, with a directional coupler 472 coupled to amplifier 444, and with an impedance-controlled transmission line 474 coupling coupler 472 to receive beamformer 420 via receiver 450. In some embodiments, directional coupler 472 may be configured to obtain a portion of a signal output from amplifier 444 as a distortion measurement of amplifier 444 and/or transmitter 440. In some embodiments, directional coupler 472 may have an input port coupled to an output of amplifier 444, an output port coupled to an antenna, and a coupled port coupled to impedance-controlled transmission line 474. In some embodiments, the isolated port of the directional coupler may be terminated in a matched load, such as the resistor illustrated in FIG. 4A.

While a directional coupler is shown in FIG. 4A, it should be appreciated that a capacitive and/or inductive coupler may be alternatively or additionally used. For example, capacitive coupling may be achieved by placing a conductor proximate the output of the amplifier to generate a suitable capacitance for coupling a portion of a signal from the amplifier output via the capacitance. As another example, inductive coupling may be achieved by placing one of two mutually coupled conductive coils at the output of the amplifier to generate suitable inductive coupling to obtain a portion of a signal from the amplifier output via the coils. The amount of inductance and/or capacitance used for coupling may depend on the amount of signal power to be obtained as a measurement as well as the frequency band(s) for which measurements are to be obtained.

In some embodiments, directional couplers 472 and/or impedance-controlled transmission lines 474 of each transceiver 430 may be configured to obtain substantially the same amount and/or phase of output power from amplifier 444 for distortion measurement, such that each distortion measurement is representative of the individual transceiver 430 and may be aggregated with distortion measurements from other transceivers 430 within beamforming circuitry 420. As one example, distortion measurements from each amplifier 444 may have the same reduction in power level, such as a reduction of 20-30 decibels (dB), and/or the same phase with respect to signals output from the amplifiers 444.

In some embodiments, impedance-controlled transmission line 474 may bypass a receive amplifier to provide a distortion measurement to receive beamformer 420. For example, as shown in FIG. 4A, impedance-controlled transmission line 474 is coupled to an output of amplifier 452 such that a distortion measurement from the output of amplifier 444 and propagated through impedance-controlled transmission line 474 does not pass through amplifier 452 to reach receive beamformer 420. In some embodiments, impedance-controlled transmission line 474 may include a microstrip, stripline, and/or other suitable transmission line structure configured to provide an appropriate impedance for interacting with directional coupler 472 and receiver 450. For example, impedance-controlled transmission line may be configured with resistive, inductive, and/or capacitive impedance components that minimize reflections into directional coupler 472 and/or from receiver 450 in a frequency band in which distortion measurements are to be obtained from amplifier 444, such as in a transmit frequency band of amplifier 444 and/or the antenna, and/or in a frequency band in which the distortion measurements are to be provided between amplifier 452 and demodulator 454. In some embodiments, impedance-controlled transmission line 474 and/or directional coupler 472 may be formed on one or more same semiconductor die(s) as other components of transceiver 430. In other embodiments impedance-controlled transmission line 474 and/or directional coupler 472 may be formed on another semiconductor die bonded directly and/or wire-bonded to the die(s) having components of transceiver 430 thereon.

In some embodiments, modulator 442 and demodulator 454 within each transceiver 430 may be configured to receive the same LO signal 460 as one another. For example, applying the same time delay and/or phase shift to a transmitted signal and to a distortion measurement obtained while transmitting that signal may facilitate creating an aggregate distortion measurement of several transceivers 430 where each distortion measurement component is substantially in phase with one another. In other embodiments, modulator 442 and demodulator 454 may be configured to receive different LO signals 460.

In some embodiments, receive beamformer 420 may be configured in the manner described herein for receive beamformer 320 of transceiver system 304. For example, as shown in FIG. 4A, beamforming circuitry of receive beamformer 420 includes first dimension summing circuits 422, first dimension switches 424, second dimension summing circuit 426, and second dimension switches 428.

In some embodiments, each first dimension summing circuit 422 may be configured in the manner described herein for summing circuit 322 of receive beamformer 320. For example, as shown in FIG. 4A, each first dimension summing circuit 422 has inputs coupled to respective transceivers 430 to receive signals and distortion measurements from the respective receivers 450. In some embodiments, each first dimension summing circuit 422 may be associated with a group of antennas in a first dimension (e.g., a row or column) of antennas in an antenna array of the antenna system. For example, transceivers 430 within the first dimension may each apply an appropriate time delay and/or phase shift to received signals such that summing signals at first dimension summing circuit 422 steers reception within the first dimension.

In some embodiments, first dimension switches 424 may be configured to couple and decouple transceivers 430 of the group to and from first dimension summing circuit 422. For example, transceiver system 400 may be configurable to use all or only a lesser subset of transceivers 430 (e.g., to transmit and/or receive using only a subset of antennas of the antenna system) depending on the operating mode of the system. For instance, in a standard operating mode, each transceiver 430 may be coupled to receive beamformer 420 and/or the transmit beamformer, whereas in a power saving mode, a lesser subset of transceivers 430 may be so coupled, thereby conserving power. In this example, transceiver system 400 may be suitable for implementing in a portable device that operates off a battery, though other implementations are within the scope of the present aspects. In some embodiments, first dimension switches 424 may include transistors suitable for operation at the IF band of transceiver system 400.

In some embodiments, receive beamformer 420 may be configured to provide multiplexed signal outputs. For example, receive beamformer 420 may be configured to selectively output signals summed from subsets of transceivers 430. For example, as shown in FIG. 4A, first dimension switches 424 couple transceivers 430 to first dimension summing circuits 422 and second dimension switches 428 couple first dimension summing circuits 422 to second dimension summing circuit 426. In some embodiments, first dimension switches 424 may be configured to selectively couple signals from a subset of transceivers 430 to first dimension summing circuits 422. Similarly, in some embodiments, second dimension switches 428 may be configured to selectively couple signals from the subset of transceivers 430 to second dimension summing circuit 426. In some embodiments, first dimension summing circuits 422 and second dimension summing circuit 426 may include multiple paths for providing selected subsets of signal outputs based on states of first dimension switches 424 and second dimension switches 428.

Figure 4B:
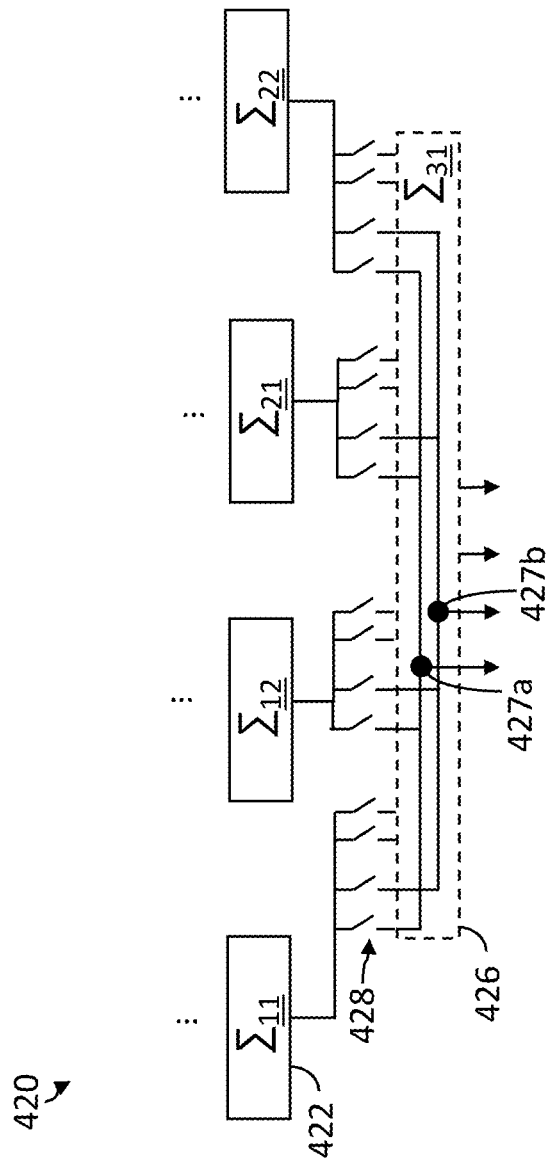
FIG. 4B is a circuit diagram of a portion of the receive beamformer of FIG. 4A further illustrating the second dimension summing circuit and the second dimension switches, according to some embodiments.

FIG. 4B is a circuit diagram of a portion of receive beamformer 420 further illustrating second dimension summing circuit 426 and second dimension switches 428, according to some embodiments.

In some embodiments, receive beamformer 420 may be configured to provide multiple signal outputs with selectively coupled signals from subsets of transceivers 430. For example, as shown in FIG. 4B, second dimension summing circuit 426 has multiple outputs. In some embodiments, each output may be configured to provide signals from a selected subset of transceivers 430. For example, shown in FIG. 4B, one output of second dimension summing circuit 426 is coupled to second dimension switches 428 by a first summer 427a and another output of second dimension summing circuit 426 is coupled to second dimension switches 428 by a second summer 427b. In the illustrated example, the outputs coupled to first and second summers 427a and 427b may output signals from different subsets of transceivers 430 (e.g., simultaneously), depending on the states of each set of second dimension switches 428.

Figure 5:
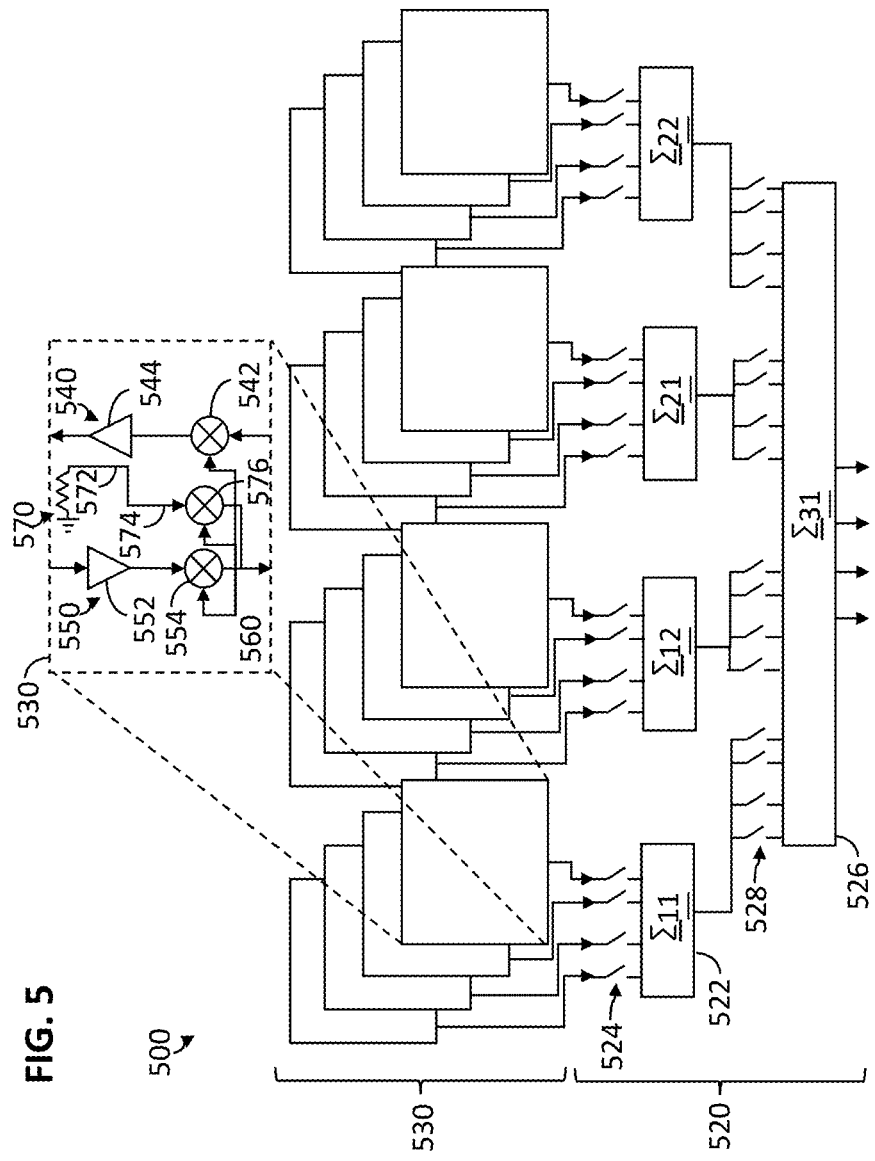
FIG. 5 is a circuit diagram of an alternative example transceiver system configured for distortion measurement with IF beamforming circuitry, according to some embodiments.

FIG. 5 is a circuit diagram of an alternative example transceiver system 500 configured for distortion measurement with IF beamforming circuitry, according to some embodiments.

In some embodiments, transceiver system 500 may be configured in the manner described herein for transceiver system 400. For example, as shown in FIG. 5, transceiver system 500 includes receive beamformer 520 and transceivers 530, which may be configured in the manner described herein for receive beamformer 420 and transceivers 430, respectively. As shown in FIG. 5, receive beamformer 520 includes first dimension summing circuits 522, first dimension switches 524, second dimension summing circuit 526, and second dimension switches 528. Also shown in FIG. 5, a transceiver 530 includes a transmitter 540 with a modulator 542 and amplifier 544 in a transmit path, a receiver 550 with an amplifier 552 and a demodulator 554 in a receive path, and distortion measurement circuitry 570.

In some embodiments, transceivers 530 may include demodulation circuitry coupled between the distortion measurement paths of the transceivers and at least a portion of receive beamformer 520 and configured to down-convert the distortion measurements from the distortion measurement paths. For example, as shown in FIG. 5, distortion measurement circuitry 570 includes a coupler 572 and impedance-controlled transmission line 574 as well as an auxiliary demodulator 576 coupled between impedance-controlled transmission line 574 and an output of demodulator 554. In some embodiments, demodulator 576 may be dedicated to distortion measurement circuitry 570 for down-converting distortion measurements to an IF band. For example, in some implementations, it may be more straightforward to implement a dedicated demodulator for distortion measurements than to match an impedance of demodulator 554 to distortion measurement circuitry 570. Accordingly, distortion measurement aspects described herein may be flexible to various implementations in this regard.

In some embodiments, demodulator 576 may be configured to receive the same LO signal 560 as modulator 542 and demodulator 554. In other embodiments, demodulator 576 may be configured to receive a different LO signal from one or each of modulator 542 and demodulator 554, depending on the application.

Figure 6:
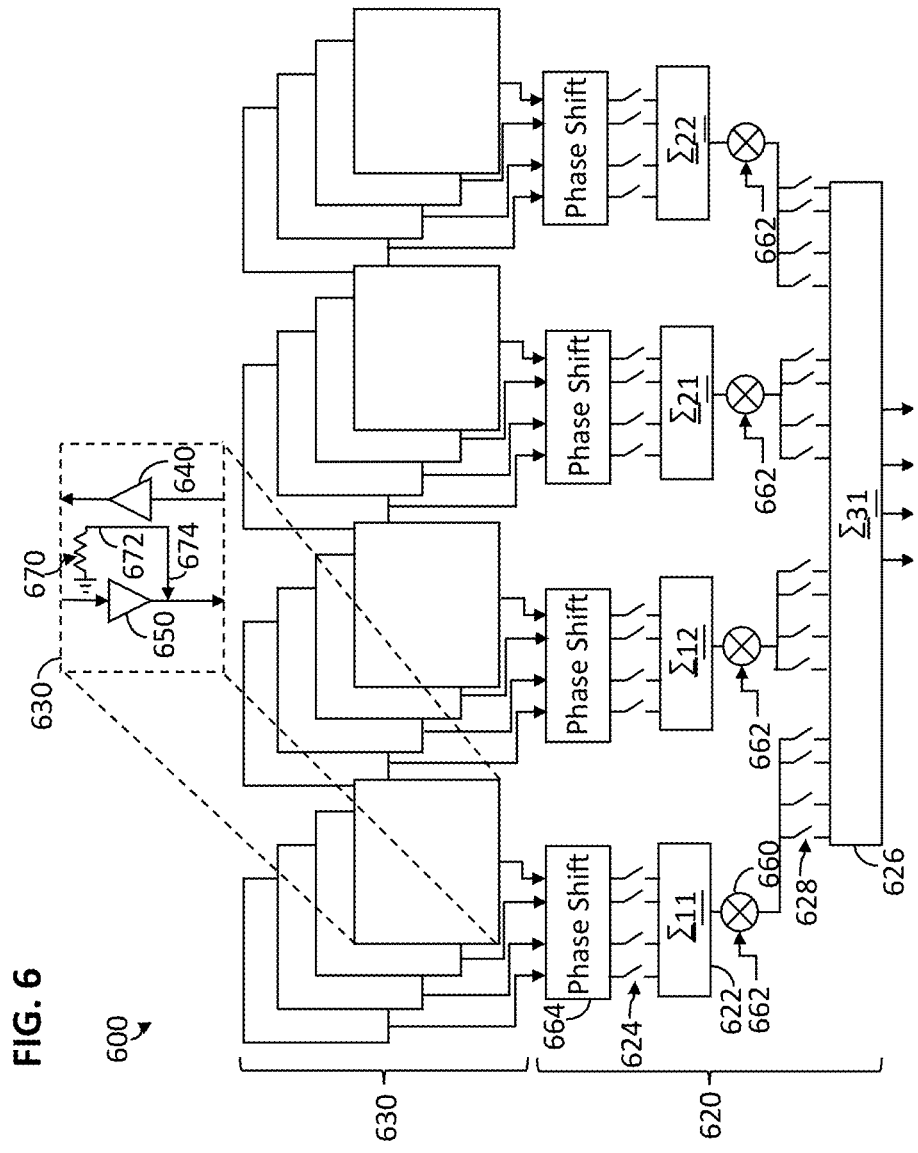
FIG. 6 is a circuit diagram of an example transceiver system configured for distortion measurement with transmit and/or receive frequency beamforming circuitry, according to some embodiments.

FIG. 6 is a circuit diagram of an example transceiver system 600 configured for distortion measurement with transmit and/or receive frequency beamforming circuitry, according to some embodiments.

In some embodiments, transceiver system 600 may be configured in the manner described herein for transceiver system 400. For example, as shown in FIG. 6, transceiver system 600 includes receive beamformer 620 and transceivers 630, which may be configured in the manner described herein for receive beamformer 420 and transceivers 430, respectively.

As shown in FIG. 6, receive beamformer includes first dimension summing circuits 622, first dimension switches 624, second dimension summing circuit 626, and second dimension summing circuit 628. Also shown in FIG. 6, a transceiver 630 includes a transmitter with amplifier 640 disposed in a transmit path, a receiver with amplifier 650 disposed in a receive path, and distortion measurement circuitry 670 with a coupler 672 and an impedance-controlled transmission line 674 coupling coupler 672 to an output of amplifier 650.

In some embodiments, at least some beamforming circuitry of receive beamformer 620 may be configured to operate in a transmit and/or receive frequency band (e.g., in a mmW frequency band). For example, as shown in FIG. 6, phase shift circuits 664 are coupled between amplifiers 650 of transceivers 630 and first dimension switches 624, and demodulators 660 are coupled between first dimension summing circuits 622 and second dimension switches 628. In this example, phase-shift circuits 664, first dimension switches 624, and first dimension summing circuits 622 may be configured to operate in the transmit frequency band in which signals are output from amplifier 640 and/or in the receive frequency band in which signals reach amplifier 650 from the antenna system. In some embodiments, each demodulator 660 may be configured to receive the same LO signal 662 to down-convert signals from the transmit and/or receive frequency to an IF band or to baseband, depending on the frequency band(s) in which the downstream beamforming circuitry is configured to operate. While phase shift circuits 664 are shown in FIG. 6, it should be appreciated that time delay circuits may be used alternatively or additionally.

In some embodiments, the examples of FIGS. 4A-6 may be implemented using multiple semiconductor dies within the same or separate packaging. For example, a first semiconductor die may support transceivers 430, 530, or 630, first dimension summing circuits 422, 522, or 622, and first dimension switches 424, 524, or 624, and a second semiconductor die may support second dimension summing circuit 426, 526, or 626 and second dimension switches 428, 528, or 628. In some cases, a baseband processor may be disposed on the second semiconductor die. In some cases, the first semiconductor die may be coupled to an antenna system. It should be appreciated, however, that other integrated circuit implementations are within the scope of the present aspects.

Although circuitry is only illustrated for one example transceiver of each transceiver system shown in FIGS. 4A-6, it should be appreciated that other transceivers of the illustrated transceiver systems may be configured in like manner.

Having described several example systems herein, it should be appreciated that other implementations than those shown by way of example are contemplated within the scope of the present aspects.

As one example, while analog circuit implementations have been described herein for beamforming circuitry and phase shift or time delay circuitry, it should be appreciated that digital beamforming, phase shift, and/or time delay circuitry may be included in some implementations where appropriate.

As another example, while the first and second dimensions of an antenna system are described herein as rows and columns, it should be appreciated that other array dimensions may be used for beamforming within the scope of the present aspects. It should also be appreciated that, while a rectangular antenna array may include rows and columns, rows and columns may be alternatively or additionally included in irregular rectangular antenna arrays (e.g., missing some elements, rows, and/or columns) and/or non-rectangular antenna arrays (e.g., with rows and/or columns offset from adjacent rows and/or columns) within the scope of the present aspects. Moreover, while only two dimensions are shown in the examples of FIGS. 4-6, it should be appreciated that more than two dimensions may be implemented within the scope of the present aspects.

As another example, according to various embodiments, antenna systems described herein or usable with examples described herein may include various types of antennas, such as dipole antennas, monopole antennas, patch antennas, slot antennas, horn antennas, and/or any other suitable antennas. In some embodiments, antennas of an antenna system may include more than one antenna element. For example, an antenna may include multiple antenna elements configured with respective polarities that are orthogonal to one another. In this example, a transceiver as described herein may be configured to operate each of the polarities of the antenna element, and/or multiple transceivers as described herein may be coupled to the antenna to operate the respective polarities. Alternatively or additionally, an antenna may include multiple radiating elements with respective feeds, and a single transceiver or multiple transceivers as described herein may be coupled to the feeds of the antenna for using the respective radiating elements.

As yet another example, while transceivers described herein may be configured to operate in frequency bands in a range from 10 GHz to 300 GHz, it is also contemplated that techniques described herein would be useful in transceivers operating at lower or higher frequencies. For instance, such techniques may be suitable for use with sub-millimeter wave beamforming transceivers developed in the future.

In some embodiments, aspects described herein may embodied in a device, such as a communications device including a system described herein, and/or a device within a system described herein. In some embodiments, aspects described herein may be embodied in a method, such as a method of operating a system described herein and/or a method performed using a system described herein.

Various aspects of the systems described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including", "comprising", "having", "containing" or "involving" and variations thereof herein, is meant to encompass the items listed thereafter and equivalents thereof as well as additional items.

The use of "coupled" or "connected" is meant to refer to circuit elements, or signals, that are either directly linked to one another or through intermediate components. Elements that are not "coupled" or "connected" are "decoupled" or "disconnected."

The terms "approximately", "substantially," and "about" may be used to mean within ±20% of a target value in some embodiments, within ±10% of a target value in some embodiments, within ±5% of a target value in some embodiments, and within ±2% of a target value in some embodiments. The terms "approximately" and "about" may include the target value.

What is claimed is:

1. A transceiver system, comprising:
a plurality of transceivers, each comprising:
a transmit path comprising a transmit amplifier; and
a receive path comprising a receive amplifier;
beamforming circuitry having a plurality of inputs coupled to respective ones of the receive paths; and
a plurality of distortion measurement paths coupling respective outputs of the transmit amplifiers to the beamforming circuitry.

2. The transceiver system of claim 1, wherein each of the plurality of distortion measurement paths comprises a coupler configured to obtain a portion of a signal output from the transmit amplifier and an impedance-controlled transmission line coupling the coupler to the beamforming circuitry.

3. The transceiver system of claim 1, wherein the plurality of transceivers are configured to operate in at least one frequency band within a range from 10 GHz to 300 GHz.

4. The transceiver system of claim 3, wherein the plurality of transceivers are configured to operate in at least one frequency band within a range from 24 GHz to 71 GHz.

5. The transceiver system of claim 1, further comprising a plurality of antennas coupled to the plurality of transceivers and configured to transmit and/or receive signals in at least one frequency band within a range from 10 GHz to 300 GHz.

6. The transceiver system of claim 1, further comprising a baseband processor configured to receive distortion measurements of the transmit amplifiers via the beamforming circuitry and perform digital pre-distortion (DPD) processing based on the distortion measurements.

7. The transceiver system of claim 6, wherein the beamforming circuitry is configured to sum the distortion measurements of the transmit amplifiers and the baseband processor is configured to use the summed distortion measurements as representative of an average distortion measurement for performing the DPD processing.

8. The transceiver system of claim 1, further comprising demodulation circuitry coupled between the plurality of distortion measurement paths and at least a portion of the beamforming circuitry and configured to down-convert the distortion measurements of the transmit amplifiers.

9. The transceiver system of claim 1, wherein the plurality of distortion measurement paths bypass the receive amplifiers to couple the respective outputs of the transmit amplifiers to the beamforming circuitry.

10. A phased array system, comprising:
an antenna;
a transmitter configured to provide signals in at least one frequency band for transmission by the antenna, the at least one frequency band being within a range from 10-300 GHz;
a receive beamformer; and
circuitry bypassing the antenna and configured to obtain a distortion measurement from the transmitter and provide the distortion measurement to the receive beamformer.

11. The phased array system of claim 10, wherein the transmitter is configured to operate in at least one frequency band within a range from 24 GHz to 71 GHz.

12. The phased array system of claim 10, wherein the circuitry comprises a coupler configured to obtain the distortion measurement from the transmitter and an impedance-controlled transmission line coupled between the coupler and the receive beamformer.

13. The phased array system of claim 12, wherein the coupler is selected from the group consisting of:
a capacitive coupler;
an inductive coupler; and
a directional coupler.

14. The phased array system of claim 13, wherein the coupler is a directional coupler.

15. The phased array system of claim 10, further comprising:
   a plurality of antennas that comprises the antenna;
   a plurality of transmitters that comprises the transmitter; and
   a plurality of impedance-controlled transmission lines that comprises the impedance-controlled transmission line,
   wherein the plurality of impedance-controlled transmission lines bypass respective ones of the plurality of antennas and are configured to obtain respective distortion measurements from respective ones of the plurality of transmitters and provide the distortion measurements to the receive beamformer.

16. The phased array system of claim 15, further comprising:
   a baseband processor configured to perform digital predistortion (DPD) processing on signals to be transmitted via the plurality of transmitters,
   wherein the receive beamformer is configured to sum the distortion measurements from the plurality of transmitters and provide the sum to the baseband processor for performing the DPD processing.

17. The phased array system of claim 16, wherein the baseband processor is configured to use the summed distortion measurements as representative of an average distortion measurement for performing the DPD processing.

18. The phased array system of claim 10, further comprising a demodulator coupled between the impedance-controlled transmission line and at least a portion of the receive beamformer and configured to down-convert the distortion measurement.

19. The phased array system of claim 10, further comprising:
   a receive amplifier configured to obtain signals in at least one mmW frequency band from the antenna;
   wherein the impedance-controlled transmission line bypasses the receive amplifier to provide the distortion measurement to the receive beamformer.

* * * * *